United States Patent

Mori et al.

[11] Patent Number: 5,159,043
[45] Date of Patent: Oct. 27, 1992

[54] PREPARATION OF POLYORGANOSILANES

[76] Inventors: Shigeru Mori, Room No. 503, Rinwa Sunny Court, No. 259, Shimosakunobe, Takatsu-ku, Kawasaki-shi, Kanagawa-ken; Eiichi Tabei, Room No. 504, Rinwa Sunny Court, No. 259, Shimosakunobe, Takatsu-ku, Kawasaki-Shi, Kanagawa-ken; Motoo Fukushima, Room No. 505, Rinwa Sunny Court, No. 259, Shimosakunobe, Takatsu-ku, Kawasaki-shi, Kanagawa-ken; Yoshinori Hida, Room No. 406, Annex K, No. 1914-1, Shimosakunobe, Takatsu-ku, Kawasaki-shi, Kanagawa-ken, all of Japan

[21] Appl. No.: 812,279

[22] Filed: Dec. 23, 1991

[30] Foreign Application Priority Data

Dec. 25, 1990 [JP] Japan .................................. 2-413796

[51] Int. Cl.$^5$ .............................................. C08G 77/06

[52] U.S. Cl. ........................................ 528/14; 528/10; 556/430

[58] Field of Search ..................... 528/10, 14; 556/430

[56] References Cited

U.S. PATENT DOCUMENTS

| | | | |
|---|---|---|---|
| 4,792,591 | 12/1988 | Rengstl et al. | 525/477 |
| 4,808,685 | 2/1989 | Bortolin | 528/14 |
| 4,839,451 | 6/1989 | Badesha et al. | 528/10 |

*Primary Examiner*—Melvyn I. Marquis
*Assistant Examiner*—Margaret W. Glass
*Attorney, Agent, or Firm*—Birch, Stewart, Kolasch & Birch

[57] ABSTRACT

Polyorganosilanes are prepared through contact reaction of an organodihalosilane with alkali metal fine particles dispersed in an organic solvent. the reaction solution is adjusted to an acidity of pH 3 to 7 before or after the step of deactivating the excess alkali metal in the reaction solution. The alkali metal halide is removed from the reaction solution by dissolving it in water. Formation of insoluble components is minimized.

1 Claim, No Drawings

PREPARATION OF POLYORGANOSILANES

CROSS-REFERENCE TO THE RELATED APPLICATION

This application is related to Shigeru MORI, Eiichi TABEI, Akira HAYASHIDA, Yoshinori HIDA and Motoo FUKUSHIMA, patent application entitled "Preparation of Polyorganosilanes", Ser. No. 07/812,284 concurrently filed herewith, corresponding to Japanese Patent Application No. 413797/1990.

This invention relates to a method for preparing polyorganosilanes.

BACKGROUND OF THE INVENTION

For the synthesis of polysilanes, the Wurtz coupling method of condensing dihalosilanes with the aid of alkali metals has been most widely used partially because the starting reactants are readily available compared with other methods. This method is applicable to the synthesis of polyorganosilanes soluble in organic solvents from difunctional diorganodihalosilanes and alkali metals, but the polyorganosilanes are obtained only in low yields due to formation of solvent-insoluble components. Probably these solvent-insoluble components are formed directly by radical polymerization or radical polymerization causes polysilane side chain moieties to crosslink into insoluble components although the polymerization mechanism associated with the Wurtz coupling reaction is complex and not well understood.

The inventors have found two main causes of the formation of insoluble components. First, insoluble components are formed during Wurtz coupling reaction. Secondary, insoluble components are also formed during the post-treatment of dissolving away a salt (such as sodium chloride), which is produced during Wurtz coupling reaction, with water. More particularly, the post-treatment includes the addition of alcohol for deactivating the alkali metal and the addition of water for washing away the salt. The formation of insoluble components during the post-treatment is presumed due to crosslinking occurring when side chain components are degraded and condensed into siloxanes through alkoxylation/silanol formation due to addition of alcohol/water. Then the majority of insoluble components are formed in the steps of deactivating the excess alkali metal used in Wurtz coupling reaction and dissolving away the salt produced during Wurtz coupling reaction. In washing away the salt (such as sodium chloride), the insoluble components tend to form an emulsion, disturbing separation between the organic solvent and water layers. It is thus time-consuming to purify the desired solvent-soluble polysilane in the organic layer.

SUMMARY OF THE INVENTION

An object of the present invention is to provide a method for preparing a polyorganosilane soluble in organic solvents while minimizing formation of insoluble components.

In preparing a polyorganosilane by subjecting an organodihalosilane to contact reaction with alkali metal fine particles dispersed in an organic solvent, the excess alkali metal is deactivated at the end of reaction. The inventors have found that the reaction solution containing a polyorganosilane can be purified by adjusting the reaction system to an acidity of pH 3 to 7 before or after the deactivating step, and thereafter washing the reaction system with water for dissolving away the alkali metal halide produced during the contact reaction. The formation of insoluble component is then minimized.

According to the present invention, there is provided a method for preparing a polyorganosilane, comprising the steps of subjecting an organodihalosilane to contact reaction with alkali metal fine particles dispersed in an organic solvent, obtaining a reaction solution containing a polyorganosilane as well as a silyl alkali metal and an alkali metal halide; deactivating the silyl alkali metal and the residual alkali metal in the reaction solution; adjusting the reaction solution to an acidity of pH 3 to 7 before or after the deactivating step; and thereafter, removing the alkali metal halide from the reaction solution by dissolving it in water, thereby purifying the reaction solution containing a polyorganosilane.

DETAILED DESCRIPTION OF THE INVENTION

The starting reactant is an organodihalosilane which may be represented by the following general formula (1).

In formula (1), $R^1$ and $R^2$ may be the same or different and are independently selected from the group consisting of a hydrogen atom and a monovalent hydrocarbon group. Preferred monovalent hydrocarbon groups are those having 1 to 12 carbon atoms, especially 1 to 6 carbon atoms, for example, substituted or unsubstituted alkyl, alkenyl, and aryl groups such as methyl, ethyl, propyl, butyl, hexyl, vinyl, allyl, phenyl, X is a halogen atom such as chlorine, bromine and iodine. Organodihalosilanes may be used alone or in admixture of two or more.

According to the present invention, the organodihalosilanes are contact reacted with alkali metal fine particles such as lithium and sodium. The amount of alkali metal used preferably ranges from about 2.0 to about 2.5 mol, especially from about 2.0 to about 2.1 mol per mol of the diorganodihalosilane. The reaction temperature is preferably 100° C. or higher, preferably 100° to 150° C. If desired, copper halides such as CuCl, $CuCl_2$, CuBr, $CuBr_2$, CuI, and $CuI_2$ may be used as a catalyst in an amount of about $1 \times 10^{-4}$ to about 5% by weight of the amount of the diorganodihalosilane.

Contact reaction of the diorganodihalosilanes with alkali metal fine particles is carried out in an organic solvent system, preferably in an inert atmosphere such as nitrogen. Useful solvents include toluene, xylene, decane, and dodecane. The reaction time may be in a range of about 4 to about 8 hours.

According to the present invention, by subjecting a diorganodihalosilane to contact reaction with alkali metal fine particles dispersed in an organic solvent, there is produced a polyorganosilane having the following general formula (2):

$$\underset{R^2}{\overset{R^1}{\left(\!-\!Si\!-\!\right)_{\!n}}} \qquad (2)$$

wherein $R^1$ and $R^2$ are as defined above and n is an integer of at least 2, preferably from 2 to 10,000.

Contact reaction of an organodihalosilane with alkali metal fine particles dispersed in an organic solvent results in a reaction solution containing an alkali metal halide, the excess alkali metal and a silyl alkali metal, which is produced during the contact reaction, along with the polyorganosilane. An alcohol including an aliphatic monohydric alcohol having 1 to 4 carbon atoms such as methanol, ethanol and isopropyl alcohol and a silanol such as trimethylsilanol is added to the reaction solution for deactivating the excess alkali metal and the silyl alkali metal. According to the present invention, an acid is added to the reaction solution to adjust its acidity to pH 3 to 7 before or after the alcoholic deactivation.

The acids used for pH adjustment include inorganic acids such as hydrochloric acid and phosphoric acid, organic acids such as acetic acid, and chlorosilanes such as trimethylchlorosilane. Preferred are hydrochloric acid and chlorosilanes, especially trimethylchlorosilane. The acid is added a sufficient amount to adjust the system to pH 3 to 7. Below pH 3, more insoluble components are formed whereas above pH 7 is ineffective for improving separation between aqueous and organic layers and restraining formation of insoluble components.

After the pH adjustment of the reaction solution, the alkali metal halide, typically sodium chloride, resulting from contact reaction is removed by dissolving it in water. To this end, water is added to the reaction solution, which separates into aqueous and organic layers. The amount of water added may be equal to twice the amount of the solvent. The organic layer in which the polyorganosilane is dissolved is then worked up in a conventional manner.

EXAMPLE

Examples of the present invention are given below by way of illustration and not by way of limitation.

EXAMPLE

A four-necked flask was charged with 4.8 grams (0.21 mol) of metallic sodium fine particles and 60 grams of xylene. With stirring and heating at a temperature of 135° C., 19.1 grams (0.1 mol) of methylphenyldichlorosilane was added dropwise to the dispersion in a nitrogen atmosphere. Contact reaction was continued for 6 hours at 135° C. The reaction solution was cooled down to room temperature, completing the reaction. 20 ml of methanol was added to the reaction solution to deactivate the excess metallic sodium. The solution was adjusted to pH 3.6 with dilute hydrochloric acid. 100 grams of water was added to the reaction solution for dissolving and separating the sodium chloride resulting from the contact reaction. The organic layer was taken out and worked up, obtaining a polyorganosilane of formula (3) in a yield of 75%.

$$\underset{C_6H_5}{\overset{CH_3}{\left(\!-\!Si\!-\!\right)_{\!n}}} \qquad (3)$$

COMPARATIVE EXAMPLE

The procedure of Example was repeated except that no hydrochloric acid was added. A polyorganosilane was obtained in a yield of 55%.

The post-treatment of the system after the sodium chloride had been washed away was compared between Example and Comparative Example as shown in Table 1. The acidified system ensured easier post-treatment and a higher yield.

TABLE 1

|  | Example | Comparative Example |
|---|---|---|
| Two layer separation | definite | indefinite |
| Separation time | 10 min. | 60 min. |
| Polymer recovery | 95% | 85% |
| Molecular weight after removal of oligomers | 60,000 | 30,000 |

There has been described a method for preparing a polyorganosilane which can minimize the formation of insoluble components during the post-treatment of a polyorganosilane-containing reaction solution. After the alkali metal halide is dissolved in water, the organic layer definitely separates from the water layer. The end polyorganosilane can be briefly purified and thus obtained in higher yields.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a polyorganosilane comprising the steps of:
    subjecting an organodihalosilane to contact reaction with alkali metal fine particles dispersed in an organic solvent, obtaining a reaction solution of a polyorganosilane containing a silyl alkali metal and an alkali metal halide,
    deactivating the silyl alkali metal and the residual alkali metal in the reaction solution with an alcohol or water,
    adjusting the reaction solution to an acidity of pH 3 to 7 before or after the deactivating step, and
    thereafter removing the alkali metal halide from the reaction solution by dissolving it in water.

* * * * *